United States Patent

[11] 3,592,239

| [72] | Inventor | Cyrus Adler<br>New York, N.Y. |
|---|---|---|
| [21] | Appl. No. | 684,885 |
| [22] | Filed | Nov. 20, 1967 |
| [45] | Patented | July 13, 1971 |
| [73] | Assignee | Offshore/Sea Development Corporation<br>New York, N.Y. |

[54] HINGED PIPE STRUCTURE
5 Claims, 10 Drawing Figs.

[52] U.S. Cl. .................................................. 138/155,
61/72.4, 138/105, 174/68, 174/84
[51] Int. Cl. ...................................................... F16l 9/22
[50] Field of Search............................................. 59/78.1;
61/72.1, 72.7; 138/100,103,105,106,110,118,120
,155; 174/68, 84; 285/18, 184; 24/217

[56] References Cited
UNITED STATES PATENTS

| 2,320,360 | 6/1943 | Grey............................ | 24/217 X |
| 2,486,003 | 10/1949 | Christensen.................. | 24/217 X |
| 2,552,066 | 5/1951 | Sorensen ..................... | 24/217 |
| 3,319,979 | 5/1967 | Herold et al................. | 285/(DIG. 20) |
| 2,501,639 | 3/1950 | Warren ....................... | 285/184 X |
| 3,060,972 | 10/1962 | Sheldon........................ | 138/120 |
| 3,092,241 | 6/1963 | Dubie........................... | 138/120 X |
| 3,165,286 | 1/1965 | Johnson et al................ | 138/110 X |

FOREIGN PATENTS

| 920,720 | 3/1963 | Great Britain................. | 61/72.3 |

Primary Examiner—Laverne D. Geiger
Assistant Examiner—Edward J. Earls
Attorney—Ryder, McAulay & Hefter ABSTRACT: A pipe structure to be placed in an inaccessible location, e.g., below the surface of a body of water, comprising a plurality of pivotally mounted pipe sections which are attached one to the other by hinge means. Each pipe section is provided with lock structure arranged to coact with structure on the next adjacent pipe sections to lock said sections with respect to one another and thereby form a continuous fluid tight conduit.

PATENTED JUL 13 1971 3,592,239

INVENTOR.
Cyrus Adler

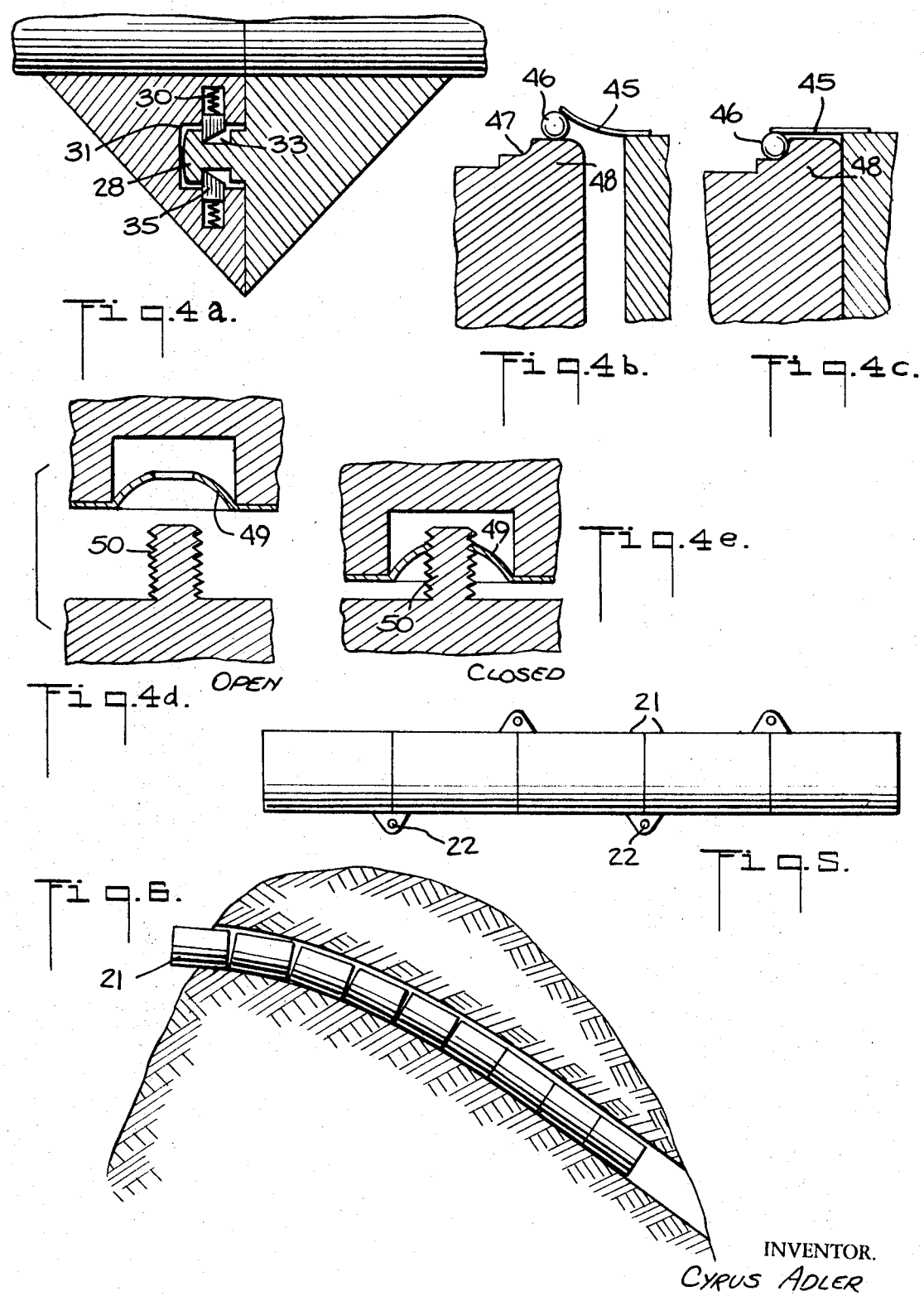

HINGED PIPE STRUCTURE

This invention relates to seals and fittings for pipe, troughs, conduits and tunnel sections and for apparatus and process for placing the pipe sections in situ and connecting them together without the necessity of positioning and sealing the sections manually when they are laid in place. The system described herein will henceforth be referred to as the CONPIPE system.

The need for the CONPIPE system is great in the laying of large diameter underwater pipes and conduits. At present laying large diameter pipe is an expensive and time consuming job. As presently practiced the installation of concrete pipe with diameters greater than 5 feet often costs much more than the pipe itself. For example in the New York Bight, the cost of installing subaqueous 10-foot diameter pipe is roughly estimated at $1,000 per foot.

There is a growing need for large diameter pipes for carrying water to cities, and for carrying waste products to sea. Concrete pipe has many advantages over steel pipe, but because of the high installation costs is not as widely used as it might be.

While ideally suited for subaqueous concrete pipe, the fittings and apparatus described herein may be used in nonunderwater installations, and the technique is in no way restricted to concrete pipe.

The technique usually used for laying large diameter pipe is described in Robley 7 Sept. 1965, U.S. Pat. No. 3,204,417.

Pipe sections are lowered into place one at a time from barges, jockeyed into place by divers and screwed together by divers. Bulkheads in earlier pipe sections are removed after the sections are bolted or welded into place. Sliding pipe sections into place down a chute is a common practice for iron pipes of smaller diameter. Cast iron pipes of 48-inch diameter with lead filled joints allow a maximum deflection of 13° for 12-ft sections. But this method requires special handling and is not used for larger concrete pipes. The problem remains of making a tight joint in situ. If the larger diameter pipes are connected by some sort of semiflexible joint at the surface, then the pipe chain loses its flexibility and the operation is at the mercy of the surface waves and weather.

The general objects of my invention are to produce a pipe locking mechanism which will allow pipe sections to remain relatively flexible up to the point where the pipe sections are to be fixed in place.

A further object is to provide a sealing mechanism that will render the pipe sections waterproof.

A further object is to make the installation of the pipe sections a simple and relatively inexpensive process.

A further object is to provide a mechanism for keeping the pipe seals clean before and while the pipes are being joined together.

A further object is to provide a simple locking mechanism.

A further object is to provide a slide or chute or other technique for allowing the pipe sections to remain flexible until the pipes are joined.

Further objects and advantages are to be found in the construction and arrangements of parts as will be described in the specifications hereinafter and in the appended claims.

In the drawings accompanying this specification

FIGS. 4a, 4b 4c, 4d and 4e show details of locking mechanisms.

FIG. 5 shows pipe sections hinged at alternate points on the faces of adjacent sections.

FIG. 6 shows pipe sections being placed into a hole over a concave-downward bend.

DESCRIPTION

Similar numerals refer to similar parts throughout the several views.

Figure 1:
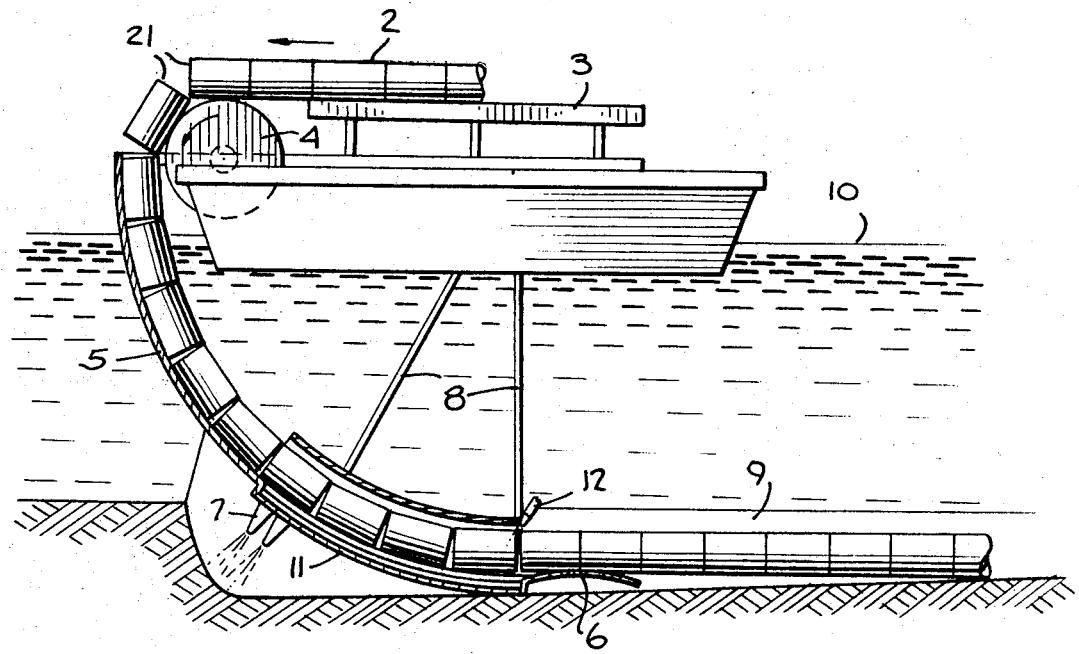
FIG. 1 is an overall side view of the CONPIPE SYSTEM in an underwater pipe laying operation.

FIG. 1 shows a barge 1, which holds spare pipe sections 2, an hydraulic platform 3, and a large cylinder 4, over which the pipe sections can be moved to a chute 5. The use of the barge for placing pipe on or below the bottom is only one application of the CONPIPE system. Nothing in this application shall be construed to limit the use of the CONPIPE system to watery environments. The CONPIPE system may just as easily be used for placing pipe in ravines or gullies or in other locations on land as shown in FIG. 6.

The chute or slide, 5, down which the pipe is fed is constructed so that it is concave upward. The pipe sections 21, are hinged by hinges 22, so that there is a triangular gap between the pipe faces while the pipe sections are bowed concavely upward as shown in FIG. 5, or concavely downward as in FIG. 6.

Hinges on adjoining pipe-sections can be bolted together just before the sections are led onto the slide thus making the sections easier to handle. Since concrete pipe of 102-inch diameter usually has a nominal thickness of over 8 inches and has steel reinforcement at the rim there is little danger that the hinged sections will pull apart or damage the pipe once it is on the slide.

A trencher, 7, (see for example Harmstorf, U.S. Pat. No. 3,222,876,) is used where necessary to cut a trench for the joined pipe sections ahead of the chute 5. Adjustable guy wires 6 and/or struts 8 help keep the chute in position. In some applications it should be possible to diminish reliance on wires and struts by positioning the pipes by floats as suggested in U.S. Pat. No. 3,214,921, Goepfert et al.

Figure 2:
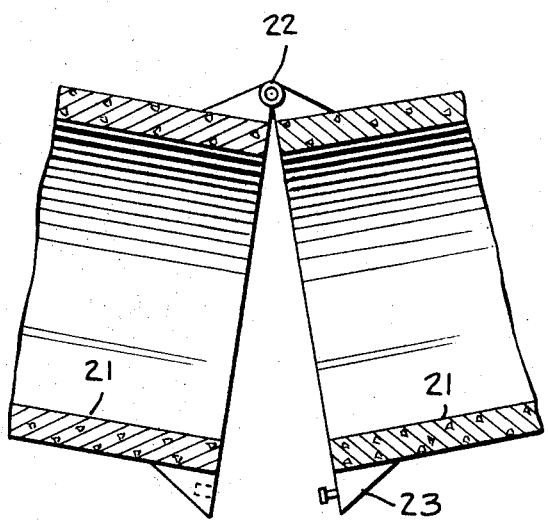
FIG. 2 shows two sections of jointed pipe in flexible or open position.

When the hinged pipe sections reach their ultimate resting position the radium of curvature of the chute is made infinite, or as is shown in FIG. 1, an arc 6, is formed concavely downward. This reversal of chute curvature causes the adjacent pipe faces to slam together. FIG. 2 is an enlarged section of two adjacent pipe sections 21 in their hinged but open position. A self-locking device 23 is provided at the rim of the pipe faces.

In another embodiment of this pipe laying system, successive sections of pipe are not hinged to each other in any way. The pipe sections are splined and slide into locking position along a curved, grooved chute. Successive sections latch into each other and lock at two or more points around the rim of each section.

When the pipe faces come together the lock or locks snap closed and prevent the pipes from coming apart. FIG. 4a shows a detail in cross section of one possible locking mechanism 23. The locking mechanisms may be placed at one or more positions around the rim of the pipe. In FIG. 4a tongue 28, fits into slot 31, of the adjacent pipe section. Bolts 35, fall into grooves 33, which are cut in the tongue. Springs 30, impell the bolts 35 into proper locking positions. Once the tongue has slipped into the slot it cannot move out.

FIG. 4b, shows another possible locking mechanism. In this mechanism flexible rods 45, with ball like ends 46, are connected to one rim of adjacent pipe sections. When the pipe sections are forced flush together the ball falls into grooves or sockets 47, provided in the adjoining pipe rim 48. Enough spring tension is provided in the rods 46, combined with the friction due to the position of the balls 46, in the sockets 47, to hold the pipes securely together.

FIG. 4c, shows another possible locking mechanism wherein a spring clamp 49, closes on a serrated stud 50, when the stud is forced past the clamp.

Figure 3:
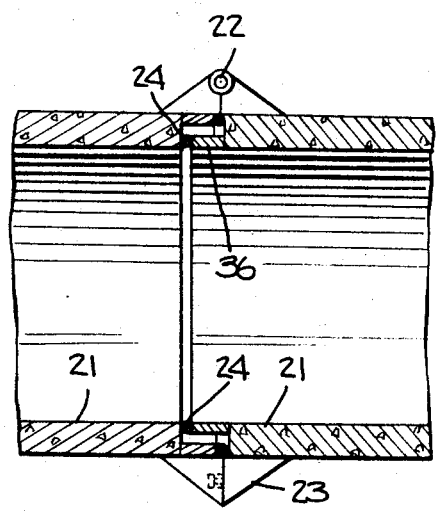
FIG. 3 shows two sections of pipe in joined or closed position.

A deformable gasket, the preferred form being O-rings 24, shown in FIG. 3, effect a tight seal. A steel lip 36, in FIG. 3 is attached to one section of pipe on its inside diameter to guide pipe sections into proper mating position with adjacent pipe sections. The lip 36, also serves as a resting place for an O-ring seal 24.

To keep the seal clean in a silty or dusty atmosphere, the unjointed pipe sections are moved through a chamber 11, in FIG. 1. To assure further cleanliness jets of air or other liquid, 12, are sprayed on the pipe faces before and while they are being joined. The jets are actuated by the movement and position of the pipe sections, or they may run continuously, or they may be actuated remotely.

In some applications it may be preferable to hinge the pipes by hinges 22, on opposite sides of the faces of adjacent pipe sections to facilitate transportation. This is shown in FIG. 5.

From the above description it can be appreciated that this invention provides a simple system for laying and joining large, as well as small, diameter pipe and trough sections underwater from a moving vessel, as well as on land. In water the vessel is moved and the guy wires and struts adjusted so as to maintain the proper curvature of the pipe sections as they are added above the water in a continuous operation.

While the pipe sections are being laid underwater the mother ship is preferably under automatic control to maintain its optimum position.

I claim:

1. A pipe adapted to be laid in relatively inaccessible locations from a station remote from the location where the pipe is to be laid, comprising:
   a plurality of pipe sections in pivotal end-to-end relationship to one another;
   a plurality of hinge means, each one of said hinge means being mounted on adjacent ends of a pair of said pipe sections to permit adjacent ones of said pipe sections to pivot relative to one another about an axis which is substantially perpendicular to a plane containing the longitudinal axes of said pipe sections,
   one of said hinge means being attached to each end of each of said pipe sections,
   each of said hinge means being positioned on said pipe sections near the outer diameter of said pipe sections to permit the adjacent ends of said pipe sections to pivot between an open position in which said adjacent ends are out of alignment and a closed position in which said adjacent ends abut so that adjacent pipe sections are in alignment,
   each of said hinge means being positioned on said pipe sections such that said axis of rotation associated with any one pair of adjacent pipe sections will be parallel to said axis of rotation associated with any other pair of adjacent pipe sections,
   and locking means mounted on said pipe sections between the adjacent ends of adjacent ones of said pipe sections, said locking means being set to remain in an unactuated state when adjacent ones of said pipe sections are pivoted out of alignment, and said locking means being automatically actuated to lock when adjacent ones of said pipe sections are pivoted into alignment,
   whereby actuation of said locking means secures said pipe sections together in substantially coaxial longitudinal alignment.

2. A pipe as recited in claim 1, wherein said locking means includes a plurality of locking mechanisms positioned around the rim of said pipe sections.

3. A pipe as recited in claim 1, wherein said locking means includes a slot set within the end of a first pipe section, a tongue extending from a second adjacent pipe section and adapted to fit into said slot when the adjacent ends abut together, said tongue having a groove therein, and a spring-biased sliding member which is spring urged into said groove in locking position when said ends abut together.

4. A pipe as recited in claim 1, wherein said locking means comprise a ball and socket locking mechanism.

5. A pipe as recited in claim 1, wherein said locking means comprise a serrated stud extending from the end of a pipe section, and a cooperating spring clamp set within the end of an adjacent pipe section and adapted to lock onto said serrated stud as said end abut together.